United States Patent
Urhahne

(10) Patent No.: US 9,096,262 B2
(45) Date of Patent: Aug. 4, 2015

(54) HANDS-ON-OFF STEERING WHEEL DETECTION FOR MOTOR VEHICLE

(71) Applicant: FORD GLOBAL TECHNOLOGIES, LLC, Dearborn, MI (US)

(72) Inventor: Joseph Andreas Urhahne, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 13/892,688

(22) Filed: May 13, 2013

(65) Prior Publication Data

US 2013/0317699 A1 Nov. 28, 2013

(30) Foreign Application Priority Data

May 25, 2012 (DE) ........................ 10 2012 208 8741

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *B62D 15/00* | (2006.01) | |
| *B62D 15/02* | (2006.01) | |

(52) U.S. Cl.
CPC .............. B62D 15/00 (2013.01); B62D 15/025 (2013.01)

(58) Field of Classification Search
CPC .... B62D 15/00; B62D 15/025; B62D 5/0466; B62D 5/006; B62D 6/007; B62D 15/0235; B62D 6/008; B62D 1/19; B62D 6/003; B60W 2530/20; B60W 30/02; B60W 40/064; B60W 40/101; B60W 40/08; B60R 21/01; B60R 21/16; B60R 22/00; B60R 21/20; B60R 21/26; B60R 16/02
USPC ............... 701/41, 42, 39, 44, 47, 127, 151, 1, 701/117, 36, 532; 702/127, 155, 56; 700/159, 175, 195, 79
See application file for complete search history.

(56) References Cited

U.S. PATENT DOCUMENTS

| | | | | |
|---|---|---|---|---|
| 4,754,829 | A * | 7/1988 | Shimizu ...................... | 180/446 |
| 5,490,435 | A * | 2/1996 | Famili .......................... | 74/552 |
| 6,082,482 | A * | 7/2000 | Kato et al. ................... | 180/402 |
| 7,019,623 | B2 * | 3/2006 | Klausner et al. ........... | 340/425.5 |
| 7,109,862 | B2 | 9/2006 | Braeuchle et al. | |
| 7,321,311 | B2 * | 1/2008 | Rieth et al. .................. | 340/576 |
| 7,554,167 | B2 * | 6/2009 | Vaganov ...................... | 257/415 |
| 7,970,511 | B2 * | 6/2011 | Kohls ............................ | 701/36 |
| 8,818,608 | B2 * | 8/2014 | Cullinane et al. ............ | 701/23 |

(Continued)

*Primary Examiner* — Calvin Cheung
*Assistant Examiner* — Luis A Martinez Borrero
(74) *Attorney, Agent, or Firm* — Frank MacKenzie

(57) ABSTRACT

In a method for detecting contact between a driver's hands and the steering wheel (12) of a vehicle, an actuator (14) for selectively applying a steering force and sensors (22) for measuring the instantaneous steering force and/or the steering angle being associated with the steering wheel (12), the actuator (14) impresses (32) a test force pulse pattern on the steering wheel (12). The steering force sensor and/or the steering angle sensor (22) measure(s) the reaction of the steering wheel movement to the test pulse pattern, and the reaction of the steering wheel movement is used to decide whether or not at least one of the driver's hands is in contact with the steering wheel (12).

23 Claims, 2 Drawing Sheets

(56) References Cited

U.S. PATENT DOCUMENTS

| | | | |
|---|---|---|---|
| 8,909,428 B1* | 12/2014 | Lombrozo | 701/42 |
| 2005/0004731 A1* | 1/2005 | Bohm et al. | 701/41 |
| 2005/0216155 A1* | 9/2005 | Kato et al. | 701/41 |
| 2006/0169519 A1* | 8/2006 | Osonoi et al. | 180/402 |
| 2007/0062753 A1* | 3/2007 | Yoshida et al. | 180/333 |
| 2007/0219691 A1* | 9/2007 | Fukuba et al. | 701/42 |
| 2008/0243340 A1* | 10/2008 | Hung et al. | 701/42 |
| 2008/0249685 A1* | 10/2008 | Hara et al. | 701/42 |
| 2008/0251312 A1* | 10/2008 | Goto et al. | 180/446 |
| 2009/0069981 A1* | 3/2009 | Barthomeuf et al. | 701/42 |
| 2009/0312909 A1* | 12/2009 | Onuma | 701/41 |
| 2010/0030429 A1* | 2/2010 | Kuramori | 701/42 |
| 2010/0131233 A1* | 5/2010 | Deng et al. | 702/151 |
| 2010/0139395 A1* | 6/2010 | Kuramori et al. | 73/379.01 |
| 2010/0218641 A1* | 9/2010 | Neumann et al. | 74/552 |
| 2010/0222976 A1* | 9/2010 | Haug | 701/70 |
| 2010/0228440 A1* | 9/2010 | Yamazaki | 701/41 |
| 2011/0153159 A1* | 6/2011 | Kulkarni et al. | 701/41 |
| 2011/0187862 A1* | 8/2011 | Ishikawa | 348/148 |
| 2011/0205081 A1* | 8/2011 | Chen et al. | 340/870.01 |
| 2011/0264329 A1* | 10/2011 | Limpibunterng et al. | 701/41 |
| 2012/0205187 A1* | 8/2012 | Izutani | 180/446 |
| 2012/0296528 A1* | 11/2012 | Wellhoefer et al. | 701/48 |
| 2012/0326735 A1* | 12/2012 | Bennett et al. | 324/705 |
| 2013/0079976 A1* | 3/2013 | Kuroda | 701/34.4 |
| 2013/0090809 A1* | 4/2013 | Kuroda | 701/41 |

* cited by examiner

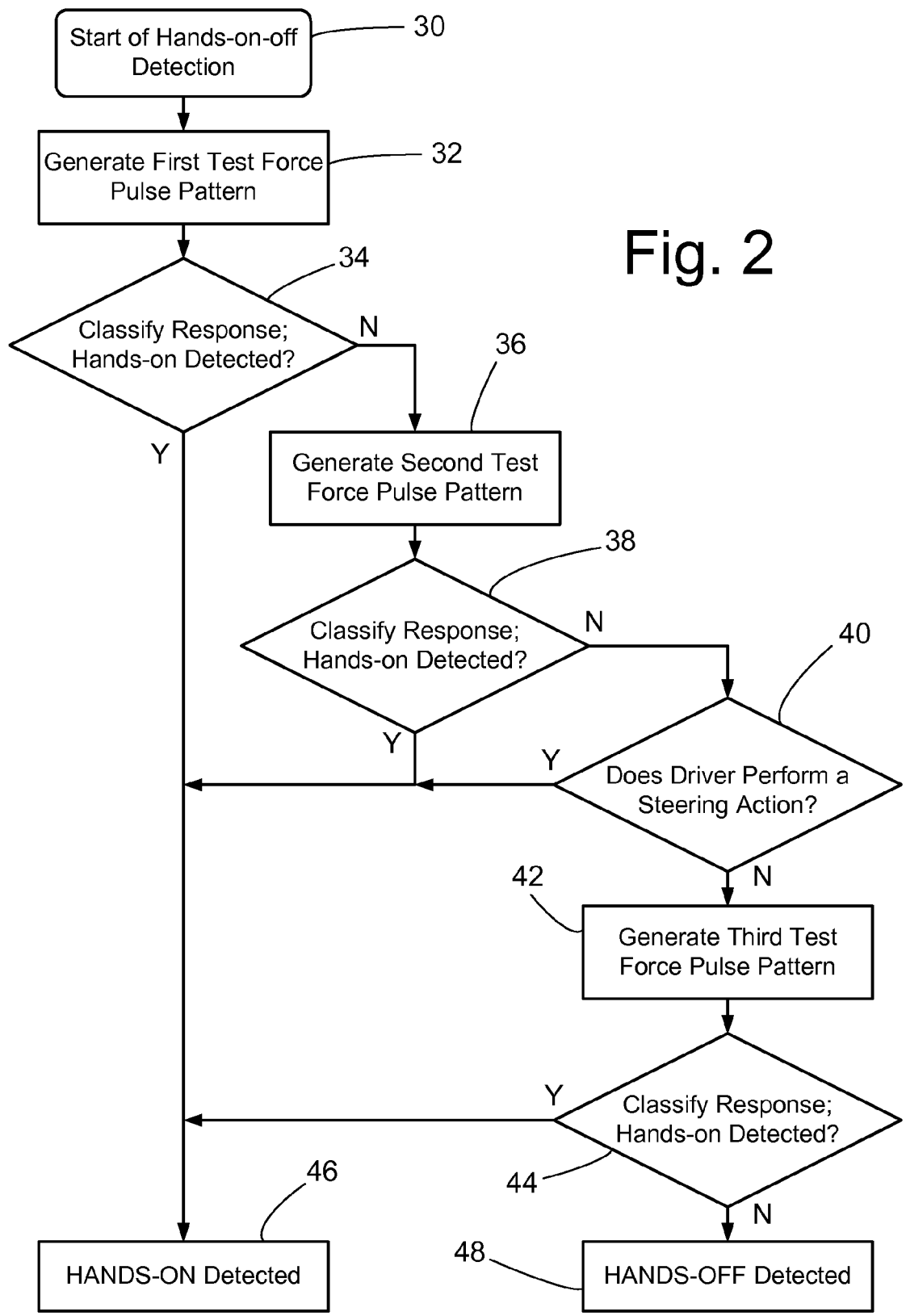

HANDS-ON-OFF STEERING WHEEL DETECTION FOR MOTOR VEHICLE

CROSS REFERENCE TO RELATED APPLICATIONS

This application claims priority to application 102012208874.1, filed in the German Patent and Trademark Office on May 25, 2012, and hereby incorporated by reference.

STATEMENT REGARDING FEDERALLY SPONSORED RESEARCH

Not Applicable.

BACKGROUND OF THE INVENTION

The present invention relates to a method and an apparatus for detecting contact between the hand(s) of a driver and the steering wheel of a motor vehicle.

The detection of whether there is contact between the driver's hands and the steering wheel (referred to as "hands-on-off" detection for short) is becoming increasingly important in view of the increasing spread of sophisticated driving assistance systems, such as lane-keeping assistance systems. Typically, these systems are only intended to assist or supplement the driver's actions, but are not designed for autonomous control or to replace the actions of a driver who no longer exerts any control of the vehicle (such as if the driver has released the steering wheel of the vehicle). In the presence of such assistance systems, however, the driver may become particularly tempted to over-rely on the system and undesirably release the steering wheel. Therefore, in operating such assistance systems, it is desirable to check whether at least one of the driver's hands is in contact with the steering wheel whereby the driver is ready to manually intervene if necessary.

If the driver's hands are not detected as being in contact with the steering wheel, various remedial actions can be taken. For example, the driver could receive an optical and/or acoustic warning, the assistance systems could switch off (possibly with a certain delay), and/or the vehicle could be automatically braked in a controlled manner while keeping to the lane and switching on the hazard warning lights. In this regard, the "hands-on-off" detection can be used to enable a "dead man's switch" of the type used in rail vehicles which operate at certain intervals in order to ensure that the driver is alive, is awake, and can react to environmental stimuli.

The detection of a hands-on state is easily made during times when the driver carries out active steering movements. Such movements can be detected by the steering angle and steering force sensors which are usually present in connection with other driving dynamics systems. However, detection becomes more difficult during times when no relatively great manual steering interventions are necessary (e.g., on relatively long, straight stretches or when automatic steering assistance systems are engaged). In these situations, manual engagement with the steering wheel may be very light (e.g., only a finger on the driver's hand may be holding the steering wheel). In any case, it is necessary for the "hands-on-off" detection to be effected in a very reliable manner. Any amount of driver engagement with the steering wheel (including slight steering movements using only a finger on a straight road, or times when the driver is holding the steering wheel substantially motionless) should still be detected as a "hands-on" state.

U.S. Pat. No. 7,109,862 discloses detecting the driver's hands on a steering wheel using an electronic circuit based on a change in the capacitance in a resonant circuit (i.e., acting as a proximity switch). However, such proximity switches require appropriate electrodes, interconnecting wiring, and a controller. In U.S. Pat. No. 7,109,862, these can be integrated with the heating wires of a steering wheel heater. However, steering wheel heaters are not a widespread feature in commercially available motor vehicles. Furthermore, capacitive sensors are relatively unreliable and often cannot determine whether the hands are actually in contact with the steering wheel or are just in the vicinity of the steering wheel.

It would be desirable to provide a method and an apparatus for detecting contact between any portion of the driver's hands with the steering wheel of a motor vehicle which distinguishes between "hands-on" and "hands-off" states in a particularly reliable manner without the need for additional hardware.

SUMMARY OF THE INVENTION

A method according to the invention is suitable for use in a vehicle in which an actuator (e.g., electric motor) for selectively applying a steering force and sensors for measuring the current steering force and/or the steering angle are associated with the steering linkage (which includes a steering wheel, a shaft, and a steering pinion). Such actuators are nowadays often already provided as standard equipment both for steering force assistance (i.e., power-assisted steering) and for carrying out steering interventions via assistance systems (e.g., lane-keeping assistance). Likewise, steering angle and/or steering force sensors are also already regularly implemented as standard equipment in conventional vehicles.

In an embodiment, the invention proceeds according to the following steps:
 a) the actuator impresses a test force pattern on the steering linkage that propagates to the steering wheel;
 b) the steering force sensor and/or the steering angle sensor measure(s) the reaction (e.g., movement) of the steering wheel to the test force pattern; and
 c) the strength of the reaction of the steering wheel is used to decide whether or not at least one of the driver's hands is in contact with the steering wheel.

The invention is based on the fact that a steering angle disruption caused by the test force pulse pattern produces a different reaction in the case of a) a free steering wheel without driver contact with at least one of the driver's hands versus the case of b) a "held" steering wheel.

If step c) does not detect that at least one of the driver's hands is in contact with the steering wheel, an advantageous refinement of the invention may provide for the method to be carried out again preferably with an increased (e.g., stronger magnitude and/or longer duration) test pulse pattern, and for it to be decided that a hands-off state exists only after a predefined number of iterations, preferably after the third iteration at the earliest. This is a type of escalation strategy which makes it possible to first of all generate a test pulse pattern with the lowest possible intensity, with the result that it is not or is scarcely perceived by the driver. However, since this intensity possibly does not suffice to distinguish a steering wheel which is held only very "loosely" from a steering wheel which has been released, the check is repeated several times, for example at least three times, with a higher test signal intensity and/or duration each time. The hands-off state is considered to have been detected only when the steering wheel movement is not "hindered" by the driver even at higher intensity.

The detection method described above is preferably interrupted prematurely as soon as the steering angle sensor and/or the steering force sensor detect(s) a steering movement and/or a steering force which can be attributed to a steering wheel movement of the driver. In this case, it is independently determined that at least one hand is in contact with the steering wheel.

Alternatively or additionally, operation of a control element (for example buttons or indicator switches) arranged on the steering wheel can also be assumed to be an indication that at least one of the driver's hands is at least sufficiently close to the steering wheel.

As already mentioned above, the test force pulse patterns are preferably formed according to a signal profile and amplitude that do not permanently influence the steering angle and that minimize the chance of them being perceived by the driver (at least during the first run of the method). In accordance with the first objective, the test pulse pattern is preferably formed by a periodic signal having a signal profile which is substantially symmetrical in both steering directions. In the simplest case, this may be two short square-wave signal sections with a positive and a negative amplitude, but sinusoidal signals over one or more periods can also be used. When the test signals are periodic, the frequency of the test pulse pattern may preferably correspond substantially to the resonant frequency for torsional vibrations of the steering wheel when it is not damped by a driver's hand. In this case, the desired detection can be carried out in a particularly selective manner since the resonant frequency of the system is "detuned" by the presence of the driver's hand. Thus, the difference between the reactions of the steering wheel to the test force pattern is larger and easier to detect since one occurs at resonance and one does not.

BRIEF DESCRIPTION OF THE DRAWINGS

FIG. 2 is a flowchart showing one preferred method of the invention.

DETAILED DESCRIPTION OF PREFERRED EMBODIMENTS

Figure 1:
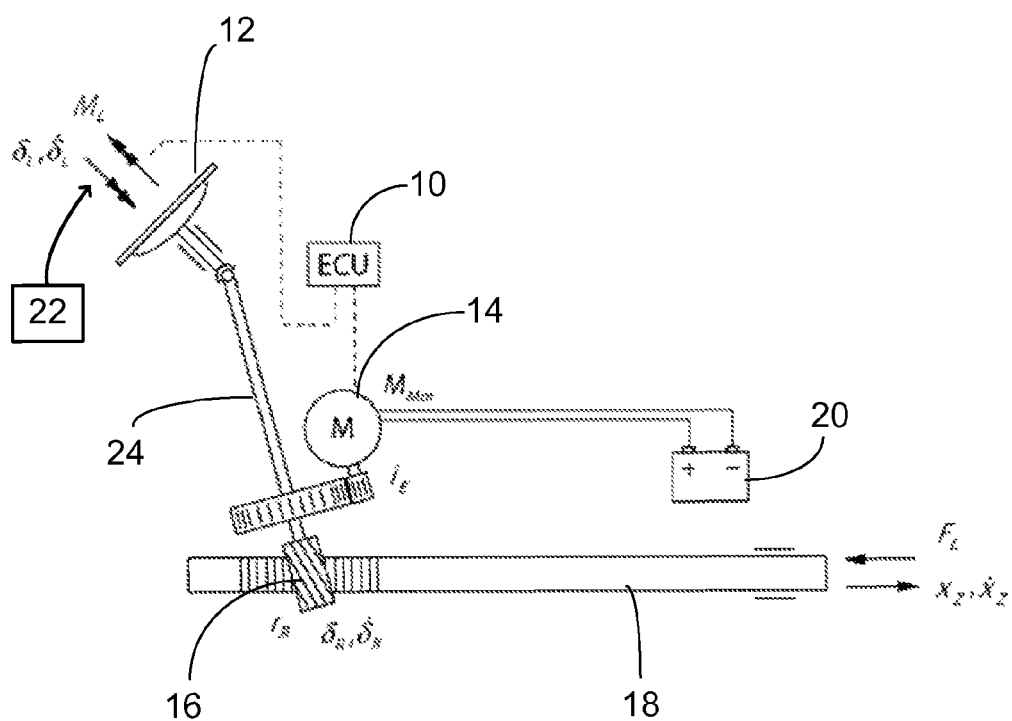
FIG. 1 shows a steering system with actuator assistance.

Referring to FIG. 1, a typical steering system of a motor vehicle with electromechanical steering force assistance has a steering wheel 12, which, in a known manner, converts the rotational movement of the steering wheel 12 into a translatory movement of a steering rod 18 via a steering shaft 24 and a steering pinion 16. Other types of steering linkage besides steering wheel 12, shaft 24 and pinion 16 can alternatively be used. As a result of the rotation of the steering linkage, a steering force $F_L$ is exerted on steering rod 18 which is deflected by the distance $x_z$ at a speed $\dot{x}_z$. The steering movement is assisted by an actuator comprised of an electric motor 14 which is positioned in the vicinity of the steering pinion 16 and is supplied with energy by a vehicle battery 20. Motor 14 is controlled by an electronic control unit (ECU) 10 in an infinitely variable manner. Various methods are known for executing in ECU 10 to derive an assistive torque to be applied by motor 14.

Both these conventional controls and the present invention are performed, in part, on the basis of sensor parameters including an instantaneous steering wheel torque $M_L$, an absolute steering wheel angle $\delta_L$ and a steering wheel angular velocity $\dot{\delta}_L$; which are measured and/or calculated based on signals from conventional sensors 22. The steering wheel angular velocity $\dot{\delta}_L$ is generally not measured directly but rather is derived from the steering wheel angle $\delta_L$ by means of differentiation.

Although electric motor 14 is designed to apply the additional steering torque to drive pinion 16 in a manner to assist the driver, the applied torque also affects steering wheel 12. In the present invention, electric motor 14 is used to generate a test force in a pulse pattern, and the effects of the test force on steering wheel movement are then analyzed. This may be a short, individual pulse, for example a square-wave pulse. So that this pulse does not result in any undesirable absolute steering angle change, it is expedient to use periodic pulse patterns in which the forces applied (and any resulting movement of the steering linkage) are effected in both steering directions, with the result that the effect of the test pulses cancels out, thereby resulting in a substantially zero net change to the steering angle.

The effect of the test pulses is detected using steering force and/or steering angle sensor 22. If used for this purpose, the steering angle sensor should have a sufficiently fine resolution on account of the slight deflections preferably used as test signals. Since this resolution may not already be available for some vehicles, the evaluation may preferably be based on use of just the steering force sensor.

The measured reaction to the test signal pattern differs depending on whether the rotational movement of steering wheel 12 is damped by contact with at least one of the driver's hands or whether the steering wheel system can vibrate freely. In the latter case, the steering forces measured in response to the test signals will be higher than in the former case. It can consequently be discerned therefrom whether there is a hands-on state. As a result of the fact that the steering wheel signal can be examined in a targeted manner for the reaction to the test signal by means of suitable signal processing (for example Fourier analysis), detection is very robust and largely independent of disturbing influences.

FIG. 2 schematically illustrates one embodiment of a method according to the invention, wherein individual steps may be omitted or carried out in another order if useful. The corresponding steps are implemented in a known manner as a software algorithm inside the electronic control unit (ECU) 10, the control unit also obviously simultaneously performing other control tasks.

Proceeding from the start of the hands-on-off detection in step 30, step 32 first of all generates a short first test force pulse, for example one period of a sine wave at a frequency which is as close as possible to the unattenuated, inherent torsional frequency of the steering system. This frequency is typically so high that no perceptible effects on the steering or the course of the vehicle will occur. Then (or at the same time, depending on the duration and speed of the test pulse) step 34 analyzes whether the steering force signal measured by a steering force sensor has such high amplitudes corresponding to the test signal that a steering wheel which has been released can be assumed. Otherwise, detection has already finished and ends in step 46 with the decision that there is a hands-on state.

Detection by impressing the force of a test signal at the natural frequency of the steering wheel system is advantageous insofar as, in the case of a steering wheel which is "detuned" by at least one of the driver's hands, a damped vibration is produced and is then perceived less clearly by the driver; whereas, in the case of a free steering wheel, the vibration is stronger but is then still not perceived by the driver in a disruptive manner owing to a lack of tactile steering wheel contact.

If a hands-on state is not detected in step 34, a second, stronger test pulse is generated in step 36 and the reaction of the response signal is again analyzed in step 38. The increase of the test force pulse pattern may be comprised of a greater force magnitude or a longer duration (i.e., larger number of cycles) of the pattern. If no clear hands-on detection is made in the second attempt, then a third, even stronger test force pulse pattern is generated in step 42 for good measure and the reaction to the pulse pattern is checked in step 44. If no indication of hand contact with the steering wheel is found here either, step 48 finally detects a hands-off state which may then result—as described at the outset—in optical and/or acoustic driver warnings or interventions in different vehicle systems.

As indicated in step 40, detection is likewise immediately ended and the hands-on state is detected whenever an active steering action is performed by the driver. For reasons of clarity, this is explicitly illustrated only for step 38; the corresponding monitoring for premature termination of the check is preferably carried out throughout the entire method.

In general, the above hands-on-off detection need not be carried out continuously. An interval of typically 10 seconds between the checks suffices for many applications, with the result that, if the steering wheel is briefly released, measures are not yet directly taken, which could otherwise be perceived by the driver as patronizing. A pause of a few seconds may also be inserted in each case between the individual escalation steps, with the result that a few seconds always elapse before a hands-off state is detected.

As a result of the fact that the test signal patterns intensify over the course of escalation, performance of the method may usually only progress to the weakly perceptible first test signal if the steering wheel is used correctly. The stronger test signals during escalation are possibly more clearly noticeable; however, since such escalations should occur rather rarely, the driver is seldom bothered by it.

What is claimed is:

1. An apparatus for detecting driver engagement with the steering wheel of a vehicle, comprising:
    a steering linkage including a steering wheel;
    an actuator configured to apply a test force pattern to the steering linkage, wherein the test force pattern is a pulse applied independent of vehicle directional control;
    a sensor for measuring a reaction of the steering wheel to the force; and
    a controller classifying the measured reaction of the steering wheel, wherein classification comprises differentiating the reaction as dampened or free.

2. The apparatus of claim 1 wherein the actuator applies a first test force pattern, and upon classifying the measured reaction as free, applying a second test force pattern to the steering linkage, wherein the second test force pattern has a magnitude greater than the first test force pattern.

3. The apparatus of claim 2 wherein the first test force pattern has a magnitude that is substantially imperceptible by the driver.

4. The apparatus of claim 1 wherein the controller monitors the sensor for a steering action attributed to a steering wheel movement by the driver, and then interrupts the applying, measuring, and classifying steps and detects engagement of the driver with the steering wheel in response to the steering movement by the driver.

5. The apparatus of claim 1 wherein the force is comprised of a test force pattern, and wherein the test force pattern is formed in a manner resulting in a zero net change to the steering angle.

6. The apparatus of claim 1 wherein the test force pattern is a periodic signal having a signal profile which is substantially symmetrical in both steering directions.

7. The apparatus of claim 6 wherein the periodic signal of the test force pattern has a frequency corresponding substantially to a resonant frequency of torsional vibrations of the steering wheel when not being damped by contact with the driver.

8. A method for detecting contact between a driver and the steering wheel of a vehicle, wherein the vehicle includes an actuator configured for selectively applying a steering force and at least one sensor configured for measuring at least one of a steering force and a steering angle associated with the steering wheel, the method comprising the steps of:
    applying a test force pattern on the steering wheel, wherein the test force pattern is a pulse;
    measuring a reaction of the steering wheel to the test force pattern; and
    classifying the measured reaction of the steering wheel, wherein classification comprises differentiating the reaction as dampened or free, and whereby a dampened reaction indicates driver engagement.

9. The method of claim 8 further comprising:
    upon classifying a first test force pattern as free, repeating the applying, measuring and classifying steps using an increased magnitude test force pattern; and
    upon classifying the reaction to the increased magnitude test force pattern as free, detecting a hands-off state.

10. The method of claim 9 wherein the first test force pattern has a magnitude that is a low magnitude test force pattern, wherein the low magnitude test force pattern is substantially imperceptible by the driver.

11. The method of claim 8 further comprising the steps of:
    monitoring the sensor for a steering action attributed to a steering wheel movement by the driver; and
    interrupting the applying, measuring, and classifying steps and detecting contact between the driver and the steering wheel in response to the steering action.

12. The method of claim 8 wherein the test force pattern is formed in a manner resulting in a zero net change to the steering angle.

13. The method of claim 8 wherein the test force pattern is a periodic signal having a signal profile which is substantially symmetrical in both steering directions.

14. The method of claim 13 wherein the periodic signal of the test force pattern has a frequency corresponding substantially to a resonant frequency of torsional vibrations of the steering wheel when not being damped by contact with the driver.

15. The method of claim 10, further comprising: upon classifying the low magnitude test force pattern as dampened, repeating the applying, measuring and classifying steps using the low magnitude test force pattern at a ten second interval.

16. The method of claim 9, further comprising: triggering an audible alarm upon classifying the reaction to an increased magnitude test force pattern as free.

17. The method of claim 8 wherein the test force pattern is applied independent of vehicle directional control.

18. A method for detecting driver engagement comprising:
    applying a low-magnitude test-force pulse pattern to a steering wheel by an actuator;
    measuring a reaction of the steering wheel to the pattern;
    classifying the reaction as dampened or free; and
        upon classifying the reaction as free, applying an increased magnitude test-force pattern, or
        upon classifying the reaction as dampened, repeating the low-magnitude test-force pattern periodically.

19. The method of claim 18 wherein the low-magnitude test-force pulse pattern has a magnitude that is substantially imperceptible by the driver.

20. The method of claim 18 wherein the pattern is applied independent of vehicle directional control.

21. The method of claim 18 further comprising:
triggering an audible alarm upon classifying the reaction to an increased magnitude test-force pulse pattern as free.

22. The method of claim 18 further comprising:
triggering an audible alarm upon classifying at least two consecutive reactions to an increased magnitude test-force pattern as free.

23. The method of claim 18 further comprising:
triggering an audible alarm upon classifying at least three consecutive reactions to an increased magnitude test-force pattern as free.

* * * * *